US010719055B2

(12) United States Patent
Burgwinkel

(10) Patent No.: US 10,719,055 B2
(45) Date of Patent: Jul. 21, 2020

(54) CONTROL DEVICE WITH ADJUSTABLE CONTROL BEHAVIOR

(71) Applicant: KHD HUMBOLDT WEDAG GMBH, Köln (DE)

(72) Inventor: Dieter Burgwinkel, Köln (DE)

(73) Assignee: KHD HUMBOLDT WEDAG GMBH, Köln (DE)

( * ) Notice: Subject to any disclaimer, the term of this patent is extended or adjusted under 35 U.S.C. 154(b) by 0 days.

(21) Appl. No.: 16/336,790

(22) PCT Filed: Sep. 27, 2017

(86) PCT No.: PCT/EP2017/074466
§ 371 (c)(1),
(2) Date: Mar. 26, 2019

(87) PCT Pub. No.: WO2018/060230
PCT Pub. Date: Apr. 5, 2018

(65) Prior Publication Data
US 2019/0227505 A1    Jul. 25, 2019

(30) Foreign Application Priority Data

Oct. 1, 2016   (DE) ......................... 10 2016 011 865

(51) Int. Cl.
*G05B 11/42*    (2006.01)
*G05B 13/04*    (2006.01)
(52) U.S. Cl.
CPC ............ *G05B 13/047* (2013.01); *G05B 11/42* (2013.01)
(58) Field of Classification Search
None
See application file for complete search history.

(56) References Cited

U.S. PATENT DOCUMENTS 5,229,699 A * 7/1993 Chu ................. G05B 11/42
318/610
5,455,495 A * 10/1995 Bec ................. G05B 11/42
318/560

(Continued)

FOREIGN PATENT DOCUMENTS

EP    2775360 A1    9/2014

OTHER PUBLICATIONS

European Search Report; priority document.

*Primary Examiner* — Thomas C Lee
*Assistant Examiner* — Gary Collins
(74) *Attorney, Agent, or Firm* — Greer, Burns & Crain, Ltd.

(57) ABSTRACT

A control device for a technical process, having at least two devices for detecting a respective input signal and at least one manipulated variable output device. The output device forms a difference between a reference variable and a controlled variable and ascertains a manipulated variable therefrom. The control device additionally has at least one internal signal processing system for influencing the time response and damping behavior of a control loop formed by the control device and technical process. At least two filter devices provide signal processing. A first filter device interacts with the process such that the control loop time response can be influenced by a filter device property change, and at least one amplification element interacts such that the control loop damping behavior can be influenced by an amplification element amplification factor change and such that the second filter device and the I element can be activated individually.

7 Claims, 2 Drawing Sheets

(56) References Cited

U.S. PATENT DOCUMENTS

| | | | | |
|---|---|---|---|---|
| 5,699,207 | A * | 12/1997 | Supino | G11B 5/5547 318/568.18 |
| 6,198,246 | B1 * | 3/2001 | Yutkowitz | G05B 11/42 318/561 |
| 2003/0199997 | A1 * | 10/2003 | Gao | G05B 5/01 700/18 |
| 2004/0083249 | A1 * | 4/2004 | Yoo | G05B 11/42 708/490 |
| 2006/0091963 | A1 * | 5/2006 | Menkhoff | G05B 11/42 331/16 |
| 2009/0192634 | A1 * | 7/2009 | Fujinaka | G05B 11/42 700/42 |
| 2009/0237282 | A1 * | 9/2009 | Hartlieb | G05B 11/36 341/143 |
| 2010/0312364 | A1 * | 12/2010 | Eryilmaz | G05B 11/42 700/30 |
| 2014/0257570 | A1 | 9/2014 | Ko | |
| 2015/0185714 | A1 * | 7/2015 | Geveci | G05B 13/04 700/29 |

* cited by examiner

CONTROL DEVICE WITH ADJUSTABLE CONTROL BEHAVIOR

CROSS-REFERENCES TO RELATED APPLICATIONS

This application claims the benefit of the International Application No. PCT/EP2017/074466, filed on Sep. 27, 2017, and of the German patent application No. 10 2016 011 865.2 filed on Oct. 1, 2016, the entire disclosures of which are incorporated herein by way of reference.

FIELD OF THE INVENTION

The invention relates to a control device (1) for controlling a technical process (2), having at least two devices for detecting a respective input signal and at least one device for outputting a manipulated variable (u), which device internally forms a difference between a reference variable (w) as first input signal and a control variable (y) as second input signal and determines a manipulated variable (u) therefrom, furthermore having at least one internal signal processing system for influencing the temporal behavior and the damping behavior of the control loop formed by control device (1) and the technical process (2) together.

BACKGROUND OF THE INVENTION

To control technical processes, what are known as PID controllers are known, these generating a signal for a manipulated variable by detecting a reference variable and a control variable. The aim of such a PID controller is to take into account internal transfer behavior when generating the manipulated variable for each technical process. In the specific case, by measuring the manipulated variable already incorporated into a technical process, the effect thereof on the control variable when this manipulated variable is incorporated further is intended to be taken into account. The PID controller firstly generates, in its P-branch (P for "proportional"), a proportion of its manipulated variable proportional to the control error (difference between reference variable and control variable), adds thereto, via its I-branch (I for "integral"), a further manipulated variable proportion by integrating the control error, and thus takes into account the effect of the past control error, and adds thereto, via its D-branch (D for "differential"), a further manipulated variable proportion that takes into account the current rate of change of the control error. Manipulated variables may be power consumptions of a technical process, and may be mixture ratios, assignment of an amount of substance and many other possible variables. The PID controller is able to control a technical process with a higher-order delay behavior such that the control variable stays as close as possible to the reference variable, even under the influence of interfering variables.

A PID controller should be adapted to the temporal behavior of a technical process on the basis of its parameters. To optimize the control parameters, it is therefore necessary to have very good knowledge about the technical process to be controlled. If accurate process knowledge is not available, it is then necessary to estimate a process model by way of the reaction behavior of the technical process, in particular the change in the control variable upon a forced change in the manipulated variable, in order in turn to estimate the individual control parameters of the PID controller therefrom. Depending on the properties of the technical process to be controlled, slight changes in the control parameters may generate a large deviation in the control behavior. To estimate control parameters, various strategies have been developed that allow the control parameters to be estimated to a satisfactory degree with acceptable time expenditure. To apply such a control strategy, however, high expertise and also a certain amount of experience are likewise necessary. Optimizing the parameterization of a controller therefore likewise requires a high degree of specialist knowledge. The theory of a controller, in particular the theory of a PID controller together with the known parameterization strategies, is assumed to be known at this juncture.

Industrial installations usually have a relatively high number of controllers. When commissioning an industrial installation, considerable efforts are made with respect to parameter optimization. As soon as the industrial installation is brought into service, experts who are entrusted with the industrial process itself take over control of the industrial installation. Since industrial installations are subject to certain fluctuations over the long term, be this through a variation in the raw materials, through a change in machine powers or through continuous optimization of production or manufacturing processes, the control parameters of an industrial installation also drift over time. Renewed parameterization again requires a high degree of time and expertise. The reason for the required expertise and time expenditure is that the control parameters have to be adapted to the changed process behavior. However, the settable control parameters do not have a direct relationship with the control behavior of a controller, such as the damping behavior and the temporal behavior of the control procedure.

SUMMARY OF THE INVENTION

The invention is therefore based on an object of providing a control device that keeps the advantages of a PID controller and overcomes the disadvantage thereof of difficult setting.

This object according to the invention is achieved in that at least two filter devices (4) and (7), an amplification element (5) and an I-element (6) are provided for signal processing, wherein a first filter apparatus (4) interacts with the process such that the temporal behavior of the control loop, formed by the control device (1) and the technical process (2) together, is able to be influenced by a change in the property of the first filter apparatus (4), and in that at least one amplification element (5) is present that interacts with the process such that the damping behavior of the control loop, formed by control device (1) and process (2), is able to be influenced by a change in the amplification factor of the amplification element (5), and in that a second filter apparatus (7) and the I-element (6) are able to be activated separately from one another.

According to the invention, it is provided that at least two filter devices are provided for signal processing, wherein a first filter apparatus (4) interacts with the technical process (2) to be controlled such that the temporal behavior of the control loop, formed by the control device (1) and the technical process (2) together, is able to be influenced by a change in the property of the first filter apparatus (4), and that at least one amplification element (5) is present that interacts with the technical process (2) to be controlled such that the damping behavior of the control loop, formed by the control device (1) and technical process (2) to be controlled, is able to be influenced by a change in the amplification factor of the amplification element (5), and that a second filter apparatus (7) and an I-element (6) are able to be activated individually and independently of one another. Unlike in PID controllers of the generic type, in the case of the control device according to the invention, individual linear factors from three different elements, namely P-element (for evaluating the control error), I-element (for evaluating the temporal integral sum of the control error) and D-element (for evaluating the rate of change of the control error) are not parameterized, but rather the first filter apparatus (4) cited in claim 1 and the amplification factor (5) cited there are incorporated and parameterized, as a result of which the control loop is able to be influenced, in a targeted manner, in the direction of a desired temporal behavior and damping behavior. Depending on the type and property of the technical process, an integrator (I-element) (6) and a further filter (7) may be added into or removed from the control device according to the invention. The idea on which the invention is based is thus that of, for particular technical types of process, configuring various filters (4, 7), the amplification element (5) and the activation of the I-element (6) such that they are able to be parameterized more easily in their composition that is typical for the technical process. The invention thus takes into consideration that a universal controller is not suitable for all processes, but rather there is provision, by combining the various components, to simplify the subsequent optimization of the setting parameters. This is possible since the control device according to the invention is parameterized in a targeted manner in the direction of parameterization of temporal behavior and damping behavior of the control loop. The parameterization thus takes place in two stages. The initial selection of the filter combination only needs to be performed once, since the type of technical process normally no longer changes. The subsequent parameterization is performed only after the composition of the process type has been determined, which parameterization is also able to be performed during operation of an industrial installation by workers who have less specialist knowledge about controllers.

There is provision, in the case of a process (2) to be controlled having a transient behavior with compensation, that is to say, of a process whose step response progresses to a new steady state, for the second filter apparatus (7) to be deactivated and the I-element (6) to be activated, as a result of which the temporal behavior of the control loop, formed by control device (1) and process (2), is influenced by the first filter apparatus (4) and the damping behavior thereof is influenced by the amplification element (5), and a fading control deviation is brought about by the I-element (6).

In the case of a process (2) to be controlled having a transient behavior without compensation and with the requirement for position follow-up control, there is advantageously provision for the second filter apparatus (7) to be activated and the I-element (6) also to be activated, as a result of which the first filter apparatus (4), the amplification element (5) and the I-element (6) are supplemented by a second filter device (7), and also stabilizes the control loop formed from control device (1) and process (2).

Finally, in the case of a process (2) to be controlled having a transient behavior without compensation and without the requirement for position follow-up control, there is advantageously provision for both the second filter apparatus (7) and the I-element (6) to be deactivated, as a result of which only the first filter apparatus (4) determines the temporal behavior and the amplification element (5) determines the damping behavior of the control loop formed from control device (1) and process (2).

In a first, specific refinement of the control device according to the invention, there is provision for the first filter apparatus (4) to have a first-order, second-order or third-order transfer function, which is defined by first order:

$$G_F(s) = \left(\frac{(1+T_{D1}s)}{(1+T_{R1}s)}\right),$$

second order $$G_F(s) = \left(\frac{(1+T_{D1}s)\cdot(1+T_{D2}s)}{(1+T_{R1}s)\cdot(1+T_{R2}s)}\right),$$

third order:

$$G_F(s) = \left(\frac{(1+T_{D1}s)\cdot(1+T_{D2}s)\cdot(1+T_{D3}s)}{(1+T_{R1}s)\cdot(1+T_{R2}s)\cdot(1+T_{R3}s)}\right),$$

wherein TD1, TD2 and TD3 are differentiating time constants of the filter >zero, TR1, TR2 and TR3 are delaying time constants of the filter >zero, and s is a Laplace operator, and the sum of all differentiating time constants TD1, TD2 and TD3 of the first filter apparatus (4) is defined as $T_{D\_overall}$, namely $$T_{D\_overall}=T_{D1}+T_{D2}+\ldots$$

wherein it is essential that $T_{D\_overall}$ may correspond at most to the sum of all delaying time constants TS1, TS2, . . . including half of the determined dead time of $$\frac{T_t}{2}$$

of the technical process (2) to be controlled, namely $$T_{D\_overall} \leq T_{S\_overall} + \frac{T_t}{2}$$

where $T_{S\_overall}$ is the sum of all delaying time constants TS1, TS2, . . . >zero of the technical process (2) to be controlled, namely $$T_{S\_overall}=T_{S1}+T_{S2}+\ldots =T_S$$

and therefore should be set equal to the determined delay time constant (TS) of a dead time-impacted PT1 model and (Tt) is the determined dead time ≥zero of the technical process (2) to be controlled, and the parameter (CW) is defined as a dynamic factor of the control device (1) that lies between 0 and 1 and determines the differentiating time constants of the filter, and therefore influences the temporal behavior of the control loop formed by control device (1) and the technical process (2), namely $$C_W = \frac{T_{D\_overall}}{T_{S\_overall}+\frac{T_t}{2}}.$$

In a second, specific refinement of the control device according to the invention, there is provision for the second filter apparatus (7) to have a transfer function, which is defined by $$G_{FI}(s) = \left(\frac{(1+T_{D1}s)}{(1+T_{R1}s)}\right),$$

in which TDI is a differentiating time constant of the filter >zero, which is defined by $$T_{DI} = \alpha \cdot \overline{\tau_\Sigma}$$

and TRI is a delaying time constant of the filter >zero, and s is a Laplace operator, wherein α is a factor from 2 to 4, and $\overline{\tau_\Sigma}$ is the resultant concentrated time constant of the technical process (2) to be controlled, which is, for its part, defined by $$\overline{\tau_\Sigma} = T_{S\_overall} + T_R + T_t - T_{D\_overall}$$

where $T_{S\_overall}$ is the sum of all delaying time constants TS1, TS2, . . . >zero of the technical process (2) to be controlled, namely $T_{S\_overall} = T_{S1} + T_{S2} + \ldots = T_S$, and should therefore be set equal to the determined delay time constant (TS) of a dead time-impacted PT1 model, and (TR) is the additionally incorporated delay time constant of the control device that is equal to the sum of the delaying time constants >zero of the two filter apparatuses (4) and (7), namely $T_R = T_{R1} + T_{R2} + \ldots + T_{RI}$, and (Tt) is the determined dead time ≥zero of the technical process (2) to be controlled, and $T_{D\_overall}$ is the sum of all differentiating time constants TD1, TD2, . . . of the first filter apparatus (4), namely $T_{D\_overall} = T_{D1} + T_{D2} + \ldots$.

In a third, specific refinement of the invention, there is provision for the amplification factor (KC) of the amplification element (5) to be calculated, by a) in the case of a process (2) to be controlled having a transient behavior with compensation, namely $$K_C = \left(\frac{1}{4 \cdot D_W^2 \cdot K_S \overline{\tau_\Sigma}}\right),$$

b) in the case of a process (2) to be controlled having a transient behavior without compensation and with the requirement for position follow-up control, $$K_C = \left(\frac{1}{8 \cdot D_W^2 \cdot K_{IS} \overline{\tau_\Sigma}^2}\right),$$

c) in the case of a process (2) to be controlled having a transient behavior without compensation and without the requirement for position follow-up control, $$K_C = \left(\frac{1}{4 \cdot D_{W2} \cdot K_{IS} \overline{\tau_\Sigma}}\right),$$

wherein (DW) is a damping factor ≥zero to be predefined, which describes the damping behavior of the overall control loop, (KS) is the determined transfer coefficient of the technical process with compensation to be controlled, (KIS) is the determined integration coefficient of the technical process without compensation to be controlled, $\overline{\tau_\Sigma}$ is the resultant concentrated time constant of the technical process (2) to be controlled, which is defined by $$\overline{\tau_\Sigma} = T_{S\_overall} + T_R + T_t + T_{D\_overall}$$

where $T_{S\_overall}$ is the sum of all delaying time constants TS1, TS2, . . . >zero of the technical process (2) to be controlled, namely $T_{S\_overall} = T_{S1} + T_{S2} + \ldots = T_S$, and should therefore be set equal to the determined delay time constant (TS) of a dead time-impacted PT1 model, and (TR) is the additionally incorporated delay time constant of the control device that is equal to the sum of the delaying time constants >zero of the two filter apparatuses, namely $T_R = T_{R1} + T_{R2} + \ldots T_{RI}$, and (Tt) is the determined dead time ≥zero of the technical process to be controlled, and $T_{D\_overall}$ is the sum of all differentiating time constants TD1, TD2, . . . >zero of the first filter apparatus (4), namely $T_{D\_overall} = T_{D1} + T_{D2} + \ldots$.

BRIEF DESCRIPTION OF THE DRAWINGS

The invention as well as exemplary embodiments are explained in more detail below with reference to the cited drawing.

In the figures.

DETAILED DESCRIPTION OF THE PREFERRED EMBODIMENTS

Figure 1:
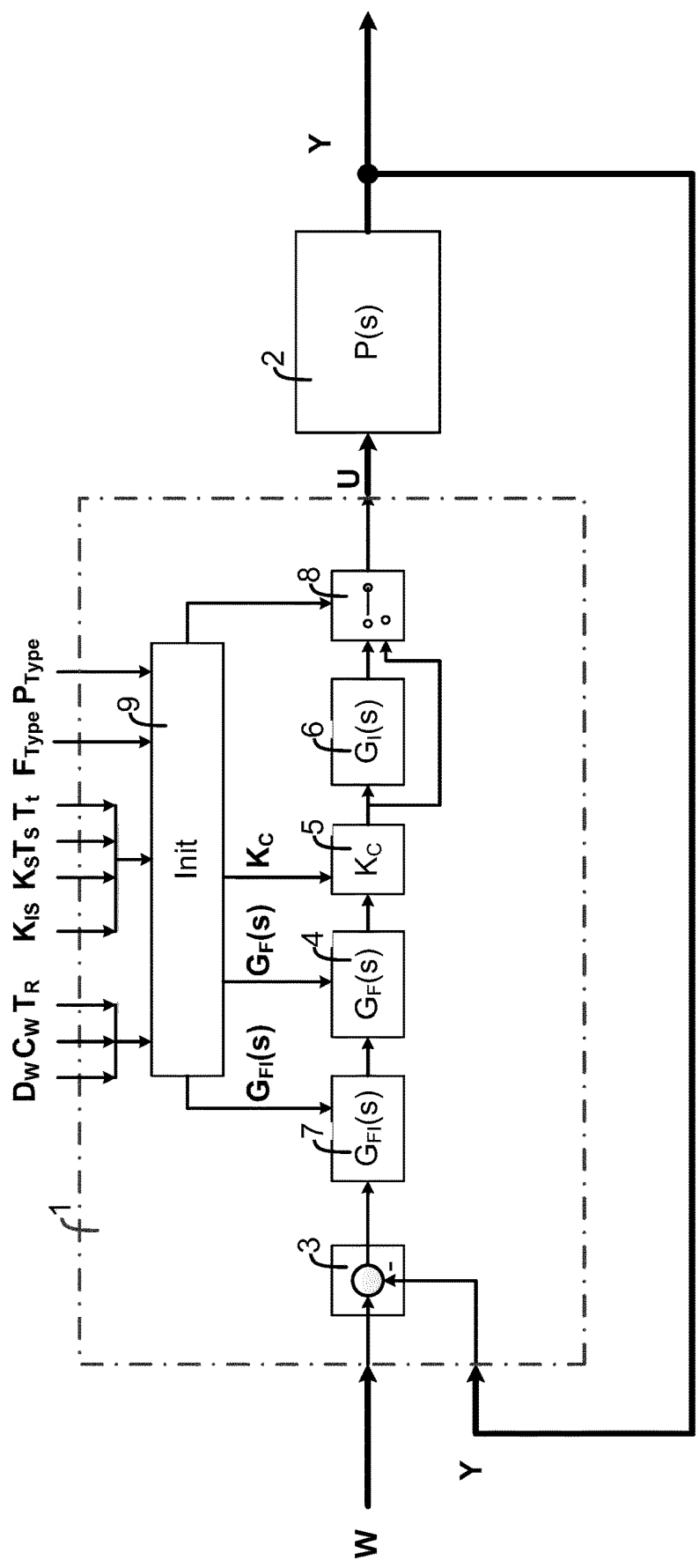
FIG. 1 shows a closed control loop having the control device according to the invention.

As sketched in FIG. 1, the control device (1) according to the invention is able to be integrated into an individual module or component. This module encloses the components comparison apparatus (3), first filter apparatus (4) and second filter apparatus (7), amplification element (5), I-element (6) and switch (8). The control device (1) according to the invention is wired in the same way as a conventional PID control device in the control loop, that is to say the control device (1) is fed with a reference variable (w) and a control variable (y) from which the control device generates a manipulated variable (u) for influencing the process (2). At the process (2), the control variable (y) is in turn tapped off as output signal of the process (2).

The control device (1) according to the invention is parameterized by predefining a damping factor (Dw) that influences the damping behavior of the control loop formed by control device (1) and process (2) and predefining a dynamic factor (Cw) that influences the temporal behavior of the control loop formed by control device (1) and process (2). Furthermore, the specification of the additionally incorporated delay time constants (TR) should be predefined for the control device (1), by way of which the manipulated variable of the control device (1) is able to be adapted to the setting element.

All of the parameters of the control device (1) according to the invention are thus assigned, in a targeted manner, to the respective properties of the control device (1) in the closed control loop.

Furthermore, the control device (1) according to the invention requires the process characteristic variables to be specified.

In the case of controlling a process (2) having a transient behavior with compensation, that is to say of a process whose step response proceeds to a new steady state, a transfer coefficient (KS), a determined dead time (Tt) and the specification of the determined delay time constants (TS) of a PT1 model corresponding to the process delay behavior should be specified.

To this end, the parameter of the control type (PType) should be set to 1 on the control device (1) by the initialization unit (9).

By virtue of this, the I-element (6) in the control device (1) is switched on and bypassing thereof is eliminated again. The filter apparatus (7) of the control device is additionally deactivated.

To design the control device (1) according to the invention, the general transfer function GS(s) of a process (2) in what is known as the Laplace or frequency domain is taken into consideration:

$$G_S(s) = \frac{Y(s)}{U(s)} = \frac{b_n s^2 + \ldots + b_1 s + b}{a_n s^2 + \ldots + a_1 s + a_0} \cdot e^{-T_t s}.$$

For a dead time-impacted control section with compensation with higher-order delay, the transfer function is written:

$$G_S(s) = \frac{K_S \cdot e^{-T_t s}}{(1 + T_{S1} s) \cdot (1 + T_{S2} s) \cdot \ldots}.$$

For the sake of simplicity, such a control section is also able to be approximated by a dead time-impacted PT1 model, which is defined by the process characteristic variables, transfer coefficient (KS), the determined dead time (Tt) and the specification of the determined delay time constant (TS)

$$G_S(s) = \frac{K_S \cdot e^{-T_t s}}{(1 + T_S s)}.$$

In the control device (1), various filter types are able to be applied to the filter apparatus (4) by the initialization unit (9), specifically by the filter selection parameter (FType).

When (FType)=1, the filter apparatus (4) is initialized with the transfer function of a first-order differentiating filter, namely $$G_F(s) = \left(\frac{(1 + T_{D1} s)}{(1 + T_{R1} s)}\right).$$

where
TD1>0 is a differentiating time constant,
TR1>0 is a delaying time constant.

When (FType)=2, the filter apparatus (4) is initialized with the transfer function of a second-order differentiating filter $$G_F(s) = \left(\frac{(1 + T_{D1} s) \cdot (1 + T_{D2} s)}{(1 + T_{R1} s) \cdot (1 + T_{R2} s)}\right),$$

where
TD1 and TD2>0 are differentiating time constants,
TR1 and TR2>0 are delaying time constants.

When (FType)=3, the filter apparatus (4) is initialized with the transfer function of a third-order differentiating filter $$G_F(s) = \left(\frac{(1 + T_{D1} s) \cdot (1 + T_{D2} s) \cdot (1 + T_{D3} s)}{(1 + T_{R1} s) \cdot (1 + T_{R2} s) \cdot (1 + T_{R3} s)}\right),$$

where
TD1 to TD3>0 are differentiating time constants,
TR1 to TR3>0 are delaying time constants.

If the series connection of the transfer function of the control loop with compensation with a filter apparatus (4) able to be selected by the initial unit (9) is now considered, the following is generally given:

$$G_{SF}(s) = \left(\frac{(1 + T_{D1} s) \cdot (1 + T_{D2} s) \cdot \ldots}{(1 + T_{R1} s) \cdot (1 + T_{R2} s) \cdot \ldots}\right) \cdot \left(\frac{K_S \cdot e^{-T_t s}}{(1 + T_{S1} s) \cdot (1 + T_{S2} s) \cdot \ldots}\right).$$

As may be seen here, there is the possibility of partly or fully compensating the delay time constants TS1, TS2, . . . responsible for the delay behavior of the control section with compensation, with the differentiating time constants of the numerator term of the filter apparatus (4) TD1, TD2, . . . .

Where the sum of all delaying time constants $T_{S\_overall}$ of the control loop with compensation with $$T_{S\_overall} = T_{S1} + T_{S2} + \ldots = T_S$$

and should therefore be set equal to the determined delay time constant (TS) of a dead time-impacted PT1 model, and where the sum of all differentiating time constants $T_{S\_overall}$ of the upstream filter apparatus (3) is $$T_{D\_overall} = T_{D1} + T_{D2} + \ldots,$$

there remains, with partial compensation (TD1+ TD1+ . . . <TS1+TS2+ . . . ), a resultant time constant $\tilde{T}_S$ of the control loop with compensation, where $$\tilde{T}_S = T_{S\_overall} - T_{D\_overall} > 0.$$

As a result, the sum of the delay times TS_overall of the control loop is thus reduced by the proportion of the compensation time constants TD_overall of the first filter apparatus (4), which leads to an improvement in the dynamic behavior of the overall circuit of filter apparatus (4) and the control loop.

The associated dynamic factor (CW), which may move between 0 and 1, is calculated from:

$$C_W = \frac{T_{D\_overall}}{T_{S\_overall}}.$$

The percentage degree of the compensation that is achieved, from 0 to 100%, is therefore calculated from:

$$C_{W\%} = \frac{(T_{D\_overall} \cdot 100)}{T_{S\_overall}}.$$

After rewriting the formula, the calculation of the compensation time constants $T_{D\_overall}$ of the filter apparatus (4) is determined depending on the dynamic factor CW to be predefined $$T_{D\_overall} = C_W \cdot T_{S\_overall}.$$

The dynamic factor CW to be predefined is therefore the only externally relevant parameter that influences the temporal behavior of the system formed by filter apparatus (4) and control section (2).

From a control point of view, the sum of the delay times TS_overall of the control loop may also be prolonged by a proportion of a dead time (Tt).

To this end, the term, associated with the control section, of the transfer function of the dead time $e^{-T_t s}$ is approximated by a Taylor series expansion, namely $$e^x = 1 + \frac{x}{1!} + \frac{x^2}{2!} + \frac{x^3}{3!} + \ldots + \frac{x^n}{n!} + \ldots,$$

where $e^{-x} = \frac{1}{e^x}$ and $x = T_t s$ $$e^{-T_t s} = \frac{1}{1 + T_t s + \frac{T_t^2}{2} s^2 + \frac{T_t^3}{2} s^3 + \ldots}.$$

Following the requirement to adjust to the values in the frequency response, a maximum proportion of $T_t/2$ is thereby able to be compensated purely computationally, such that the following relationship is achieved:

$$T_{D\_overall} = C_W \cdot \left(T_{S\_overall} + \frac{T_t}{2}\right).$$

In the selection of the dynamic factor (CW) to be predefined, in the same way as when tightening a screw, the value, starting from zero, should be increased and stop upon damping behavior of the closed control loop that no longer corresponds to the required damping factor (Dw).

In this case, the control device according to the invention provides a beneficial opportunity for the user, since a conclusion as to the quality of the modeled process is able to be drawn from the behavior of the closed control loop.

For example, sluggish behavior in the control profile indicates that the applied damping behavior is moving far below the set damping behavior and indicates a time constant of the modeled process that has been selected so as to be too large. In this case, the time constant of the modeling should be reduced. The control device will then be able to be configured in accordance with expectations.

In addition to the controller setting, a more accurate image of the associated PT1 model is thus also obtained.

The order of the first filter apparatus (4) should also be selected depending on the order of the actual control section, as higher degrees of compensation are thus able to be achieved.

In the control sector, it is known to specify the sum time constants $T_\Sigma$ as the sum of all delaying time constants of a control loop TS1, TS2, . . . , plus a loop dead time Tt of a control section and minus all differentiating time constants of a control loop TDS1, TDS2, . . . :

$$T_\Sigma = T_{S1} + T_{S2} + \ldots + T_t - T_{DS1} - T_{DS2} - \ldots.$$

In the case of partial compensation of the section time constants, a resultant sum time constant $\bar{T}_\Sigma$ is given for the overall circuit of filter apparatus (4) and the control loop with compensation. This also includes the sum of the delay time constants TR introduced by the control device itself and that serve for an achievable manipulated variable of the control device, and the sum of the differentiating time constants of the control device $T_{D\_overall}$, where $$\bar{T}_\Sigma = T_{S\_overall} + T_R + T_t - T_{D\_overall}.$$

The amplification factor (KC) of the amplification element (5), which is supplemented by the I-element (6) in control sections with compensation, is calculated according to the adjustment to the values in the frequency response:

$$K_C = \left(\frac{1}{4 \cdot D_{W2} \cdot K_{IS} \bar{T}_\Sigma}\right),$$

where

DW≥0 is a damping factor to be predefined, which describes the damping behavior of the closed control loop, KS is the determined transfer coefficient of the technical process (2) with compensation to be controlled, and $\bar{T}_\Sigma$ is the resultant sum time constant.

The parameters of the control device (1) according to the invention are accordingly explicitly determined, firstly by the characteristic variables, detected by models, of the process (KS), (TS) and (Tt), and secondly by predefining the damping behavior of the closed control loop, by the damping factor (Dw), and by predefining the temporal behavior of the control loop, by the dynamic factor (Cw), and by specifying the delay time constants (TR) additionally introduced by the control device.

In the case of a control section without compensation and without the requirement for position follow-up control, the parameter of the control type (PType) is set to 2 in the control device (1) by the initialization unit (9) and therein.

As a result, the I-element (6) is bypassed in the control device (1).

For a dead time-impacted control section without compensation with higher-order delay, the transfer function is written:

$$G_S(s) = \frac{K_{IS}}{s} \cdot \frac{e^{-T_t s}}{(1 + T_{S1} s) \cdot (1 + T_{2S} s) \cdot \ldots},$$

For the sake of simplicity, such a control section is also able to be approximated by a dead time-impacted IT1 model, which is defined by the process characteristic variables integration coefficient (KIS), determined dead time (Tt) and the determined delay time constant (TS), where $$G_S(s) = \frac{K_{IS}}{s} \cdot \frac{e^{-T_t s}}{(1 + T_S s)},$$

In this case, the amplification factor (KC) of the amplification element (5) is calculated according to the adjustment to the values in the frequency response:

$$K_C = \left(\frac{1}{4 \cdot D_W^2 \cdot K_{IS} \cdot \bar{T}_\Sigma}\right),$$

where

DW≥0 is a damping factor to be predefined, which describes the damping behavior of the closed control loop.

KIS is the determined integration coefficient of the technical process (2) without compensation to be controlled, $\bar{T}_\Sigma$ is the resultant concentrated time constant of the technical process (2) to be controlled, which is calculated by $$\bar{T}_\Sigma = T_{S\_overall} + T_R + T_t - T_{D\_overall}.$$

All other descriptions regarding predefining the temporal behavior of the control loop by way of the dynamic factor (Cw) correspond to the abovementioned descriptions of the control of dead time-impacted control sections with compensation.

The parameters of the control device (1) according to the invention are accordingly explicitly determined in this case as well: firstly by the characteristic variables, detected by models, of the process (KIS), (TS) and (Tt), and secondly by predefining the damping behavior of the closed control loop, by the damping factor (Dw), and by predefining the temporal behavior of the control loop, by the dynamic factor (Cw), and by specifying the delay time constants (TR) additionally introduced by the control device.

In the case of a control section without compensation and with the requirement for position follow-up control, the parameter of the control type (PType) is set to 3 in the control device (1) by the initialization unit (9) and therein.

By virtue of this, the I-element (6) in the control device (1) is switched on again and bypassing thereof is eliminated again. In addition, the filter apparatus (7) of the control device is switched on, and its additional differentiating time constant is optimized according to the adjustment to the values in the frequency response.

The transfer function of the additional filter apparatus (7) is represented by:

$$G_{FI}(s) = \left(\frac{(1+T_{DI}s)}{(1+T_{RI}s)}\right),$$

where
TDI>0 is a differentiating time constant that is determined by $$T_{DI} = \alpha \cdot \widetilde{T_\Sigma}$$

where
α=2 to 4 is a factor defined in the control device,
$\widetilde{T_\Sigma}$ is the resultant concentrated time constant of the technical process (2) to be controlled, which is calculated by $$\widetilde{T_\Sigma} = T_{S\_overall} + T_R + T_t - T_{D\_overall}$$

$T_{RI}$ is a delaying time constant >zero

In this case, the amplification factor KC of the amplification element (5) is calculated according to the adjustment to the values in the frequency response:

$$K_C = \left(\frac{1}{8 \cdot D_W^2 \cdot K_{IS} \cdot \widetilde{T_\Sigma}^2}\right),$$

where
DW≥0 is a damping factor to be predefined, which describes the damping behavior of the closed control loop,
KIS is the determined integration coefficient of the technical process (2) without compensation to be controlled,
$\widetilde{T_\Sigma}$ is the resultant concentrated time constant of the technical process (2) to be controlled, which is calculated by $$\widetilde{T_\Sigma} = T_{S\_overall} + T_R + T_t - T_{D\_overall}$$

All other descriptions regarding predefining the temporal behavior of the control loop by way of the dynamic factor (Cw) correspond to the abovementioned descriptions of the control of dead time-impacted control sections with compensation.

The parameters of the control device (1) according to the invention are accordingly explicitly determined in this case as well: firstly by the characteristic variables, detected by models, of the process (KIS), (TS) and (Tt), and secondly by predefining the damping behavior of the closed control loop, by the damping factor (Dw), and by predefining the temporal behavior of the control loop, by the dynamic factor (Cw), and by specifying the delay time constants (TR) additionally introduced by the control device.

Figure 2:
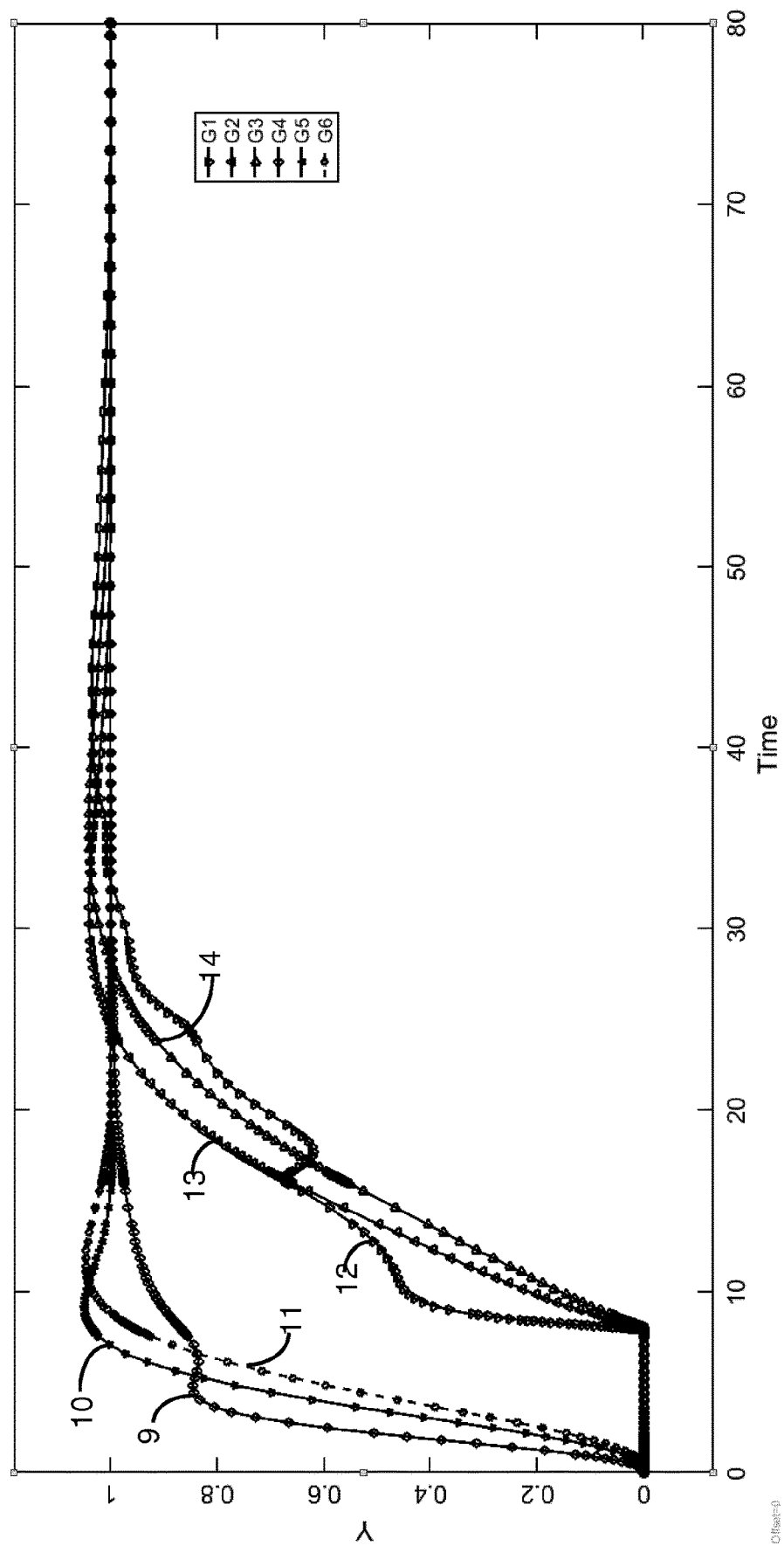
FIG. 2 shows timing diagrams of step responses of various control loops.

FIG. 2 shows the reference behavior of various controllers on a 4th-order purely delay-impacted control section (curves 9, 10, 11) and on a 2nd-order dead time-time impacted control section (curves 12, 13, 14) in the form of timing diagrams with the abscissa as time axis and the ordinate for the standardized control variable.

The curve (9) was obtained using a PID controller that was designed with aperiodic reference behavior in accordance with the setting rule according to Chien, Hrones and Reswick. In this case, it is possible to see inadequate setting, as a result of which the controller is only poorly able to adjust with the dominant dead time of the control loop. The control device according to the invention having a 2nd-order filter device was used to generate the two curves (10) and (11), the differences between the curves resulting from various controller settings. Both curves were recorded with the same damping factor (DW) of 0.7. A dynamic factor (CW) of 0.5 (50%) was selected for curve (10) and a dynamic factor (CW) of 0.6 (60%) was selected for curve (11). Two points are particularly important for the reference behavior: Firstly, the settling process with the control device according to the invention takes place more quickly and more quietly than with the conventionally set PID controller. Secondly, in the control device according to the invention, the temporal behavior of the settling process is able to be varied by the dynamic factor (CW), and its overshoot behavior is able to be varied by the damping factor (DW), independently of one another within wide ranges, such that a good controller setting is able to be found in accordance with personal preferences.

In the control device according to the invention, there is an advantage in the fact that the parameters influence the properties of the closed control loop in a targeted manner and a change in the damping behavior is able to be adjusted in a targeted manner by the damping factor (Dw), whereas a change in the temporal behavior of the control loop is able to be adjusted in a targeted manner by the dynamic factor (Cw).

Although only the two curves (10) and (11) of the control device according to the invention at this control section are shown in FIG. 2, a continuous transition between these curves with constant damping behavior is of course possible. In the same way, a change to a higher or lower overshoot behavior is also possible.

The curves (12) of the 2nd-order dead time-impacted control section were likewise obtained using a PID controller that was designed with aperiodic reference behavior in accordance with the setting rule according to Chien, Hrones and Reswick. In this case too, it is possible to see inadequate setting, as a result of which the controller poorly adjusts the control section. The control device according to the invention having a 2nd-order filter device was used to generate the two curves (13) and (14), the differences between the curves resulting from various controller settings. Both curves were recorded with the same damping factor (DW) of 0.7. A dynamic factor (CW) of 0.5 (50%) was selected for curve (13) and a dynamic factor (CW) of 0.6 (60%) was selected for curve (14).

In this case too, in the control device according to the invention, there is an advantage in the fact that the parameters influence the properties of the closed control loop in a targeted manner, wherein a change in the damping behavior is able to be adjusted in a targeted manner by the damping factor (Dw), whereas a change in the temporal behavior of the control loop is able to be adjusted in a targeted manner by the dynamic factor (Cw).

A further improvement in the control quality in comparison with the PID controller is able to be achieved by activating the 3rd-order filter apparatus, which has a pronounced influence in particular in higher-order control loops.

The curves (9) to (14) that are shown assume ideal conditions and demonstrate what is theoretically able to be achieved with the control device according to the invention. Under real conditions, when for example the process model is inaccurate or limitations take effect, the real behavior may deviate from the ideal behavior.

However, the control device according to the invention also offers the possibility of drawing conclusions as to the quality of the modeled process from the behavior of the closed control loop.

For example, sluggish behavior in the control profile, which, from its overshoot behavior, is moving far below the set damping behavior, thus indicates a time constant of the modeled process that has been selected so as to be too large. In this case, the time constant of the modeling should be adjusted to a smaller value. The control device according to the invention may then also be configured in accordance with expectations, as it is operating with a more accurate model of the control section.

In the selection of the dynamic factor (CW), in the same way as when tightening a screw, the value, starting from zero, may be increased and stop upon damping behavior of the closed control loop that no longer corresponds to the predefined damping factor (Dw). A further improvement in the dynamic property in the closed control loop may then be brought about only by way of increasing the order of the first filter apparatus (4).

The control device according to the invention also exhibits robust behavior when disturbances take effect on the manipulated variable (u) or on the control variable (y).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

| | |
|---|---|
| 1 | control device |
| 2 | technical process to be controlled (control section) |
| 3 | comparison apparatus |
| 4 | first filter apparatus |
| 5 | amplification element |

-continued

LIST OF REFERENCE SIGNS

| | |
|---|---|
| 6 | I-element |
| 7 | second filter apparatus |
| 8 | switch |
| 9 | initialization unit |
| u | manipulated variable |
| w | reference variable |
| y | control variable |
| $C_w$ | dynamic factor to be predefined |
| $F_{Type}$ | parameter for selecting the type of the first filter apparatus |
| $D_w$ | damping factor to be predefined |
| $K_S$ | determined transfer coefficient of a control section with compensation |
| $K_{IS}$ | determined integration coefficient of a control section without compensation |
| $P_{Type}$ | parameter for selecting the type of process to be controlled |
| $T_R$ | sum of the delay time constants of the two filter apparatuses |
| $T_S$ | determined delay time constants of the control section |
| $T_S$ | determined dead time of the control section |

The invention claimed is:

1. A control device for controlling a technical process, comprising:
at least two devices for detecting a respective input signal, and
at least one device for outputting a manipulated variable (u), which device internally forms a difference between
a reference variable (w) as first input signal and
a control variable (y) as second input signal and
determines a manipulated variable (u) therefrom, furthermore having
at least one internal signal processing system for influencing a temporal behavior and a damping behavior of a control loop formed by the control device and the technical process together,
wherein,
at least two filter devices and, an amplification element and an I-element are provided for signal processing,
wherein
a first filter apparatus interacts with the process such that the temporal behavior of the control loop, formed by the control device and the technical process together, is able to be influenced by a change in a property of the first filter apparatus,
and wherein
at least one amplification element is present that interacts with the process such that the damping behavior of the control loop, formed by the control device and the process, is able to be influenced by a change in an amplification factor of the amplification element,
and wherein
a second filter apparatus and the I-element are able to be activated separately from one another.

2. The control device as claimed in claim 1, wherein in a case of a technical process to be controlled having a transfer behavior with compensation, specifically, a process whose step response progresses to a new steady state, the second filter apparatus is deactivated and the I-element is activated, as a result of which the temporal behavior of the control loop, formed by control device and process, is influenced by the first filter apparatus and the damping behavior thereof is influenced by the amplification element, and a fading control deviation is brought about by the I-element.

3. The control device as claimed in claim 1, wherein in a case of a process to be controlled having a transient behavior without compensation and with a requirement for position follow-up control, the second filter apparatus is activated and also the I-element is activated, as a result of which the first filter apparatus, the amplification element and the I-element are supplemented by a second filter device, and also stabilizes the control loop formed from the control device and the process.

4. The control device as claimed in claim 1, wherein in a case of a process to be controlled having a transient behavior without compensation and without a requirement for position follow-up control, both the second filter apparatus and the I-element are deactivated, as a result of which only the first filter apparatus determines the temporal behavior and the amplification element determines the damping behavior of the control loop formed from control device and process.

5. The control device as claimed in claim 1, wherein the first filter apparatus has a first-order, second-order or third-order transfer function, which is defined by first order:

$$G_F(s) = \left(\frac{(1 + T_{D1}s)}{(1 + T_{R1}s)}\right),$$

second order $$G_F(s) = \left(\frac{(1 + T_{D1}s) \cdot (1 + T_{D2}s)}{(1 + T_{R1}s) \cdot (1 + T_{R2}s)}\right),$$

third order:

$$G_F(s) = \left(\frac{(1 + T_{D1} \cdot s) \cdot (1 + T_{D2} \cdot s) \cdot (1 + T_{D2} \cdot s)}{(1 + T_{R1} \cdot s) \cdot (1 + T_{R2} \cdot s) \cdot (1 + T_{R2} \cdot s)}\right),$$

wherein $T_{D1}$, $T_{D2}$ and $T_{D3}$ are differentiating time constants of the filter >zero, $T_{R1}$, $T_{R2}$ and $T_{R3}$ are delaying time constants of the filter >zero, and s is a Laplace operator, and a sum of all differentiating time constants $T_{D1}$, $T_{D2}$ and $T_{D3}$ of the first filter apparatus is defined as $T_{D\_overall}$, namely $T_{D\_overall} = T_{D1} + T_{D2} + \ldots$ wherein it is essential that $T_{D\_overall}$ may correspond at most to the sum of all delaying time constants $T_{S1}$, $T_{S2}$, ... including half of a determined dead time of $$\frac{T_t}{2}$$

of the technical process to be controlled, namely $$T_{D\_overall} \leq T_{S\_overall} + \frac{T_t}{2}$$

where $T_{S\_overall}$ is a sum of all delaying time constants $T_{S1}$, $T_{S2}$, ... >zero of the technical process to be controlled, namely $T_{S\_overall} = T_{S1} + T_{S2} + \ldots = T_S$ and should therefore be set equal to the determined delay time constant ($T_S$) of a dead time-impacted PT1 model, and $T_t$ is a determined dead time ≥zero of the technical process to be controlled, and a parameter ($C_W$) is defined as a dynamic factor, to be predefined, of the control device that lies between 0 and 1 and determines the differentiating time constants of the filter, and therefore influences the temporal behavior of the control loop formed by control device and the technical process, namely $$C_W = \frac{T_{D\_overall}}{T_{S\_overall} + \frac{T_t}{2}}.$$

6. The control device as claimed in claim 1, wherein the second filter apparatus has a transfer function that is defined by $$G_{F1}(s) = \left(\frac{(1 + T_{D1}s)}{(1 + T_{R1}s)}\right)$$

wherein $T_{DI}$ is a differentiating time constant of the filter >zero, which is defined by $T_{DI} = \alpha \cdot \bar{T}_\Sigma$ and $T_{RI}$ is a delaying time constant of the filter >zero, and s is a Laplace operator, wherein α is a factor from 2 to 4, and $\bar{T}_\Sigma$ is a resultant concentrated time constant of the technical process to be controlled, which is defined by $\bar{T}_\Sigma = T_{S\_overall} + T_R + T_t - T_{D\_overall}$ where $T_{S\_overall}$ is a sum of all delaying time constants $T_{S1}$, $T_{S2}$, >zero of the technical process to be controlled, namely $T_{S\_overall} = T_{S1} + T_{S2} + \ldots = T_S$ and should therefore be set equal to a determined delay time constant ($T_S$) of a dead time-impacted PT1 model, and $T_R$ is an additionally incorporated delay time constant of the control device that is equal to a sum of the delaying time constants >zero of the two filter apparatuses, namely $$T_R = T_{R1} + T_{R2} + \ldots + T_{RI}$$

and $T_t$ is a determined dead time ≥zero of the technical process to be controlled, and $T_{D\_overall}$ is a sum of all differentiating time constants >zero $T_{D1}, T_{D2}, \ldots$ of the first filter apparatus, namely $T_{D\_overall} = T_{D1} + T_{D2} + \ldots$.

7. The control device as claimed in claim 1, wherein an amplification factor $K_C$ of the amplification element is calculated by a) in a case of a process to be controlled having a transient behavior with compensation, namely $$K_C = \left( \frac{1}{4 \cdot D_W^2 \cdot K_S \cdot \tilde{T}_\Sigma} \right),$$

b) in a case of a process to be controlled having a transient behavior without compensation and with a requirement for position follow-up control, $$K_C = \left( \frac{1}{8 \cdot D_W^2 \cdot K_{IS} \cdot \tilde{T}_\Sigma^2} \right),$$

c) in a case of a process to be controlled having a transient behavior without compensation and without a requirement for position follow-up control, $$K_C = \left( \frac{1}{4 \cdot D_W^2 \cdot K_{IS} \cdot \tilde{T}_\Sigma} \right),$$

wherein $D_W$ is a damping factor ≥zero to be predefined, which describes a damping behavior of the overall control loop, $K_S$ is a determined transfer coefficient of the technical process with compensation to be controlled, $K_{IS}$ is a determined integration coefficient of the technical process without compensation to be controlled, $\tilde{T}_\Sigma$ is a resultant concentrated time constant of the technical process to be controlled, which is defined by $$\tilde{T}_\Sigma = T_{S\_overall} + T_R + T_t - T_{D\_overall}$$

where $T_{S\_overall}$ is a sum of all delaying time constants $T_{S1}, T_{S2}, \ldots$ >zero of the technical process to be controlled, namely $$T_{S\_overall} = T_{S1} + T_{S2} + \ldots = T_S$$

and should therefore be set equal to a determined delay time constant ($T_S$) of a dead time-impacted PT1 model, and $T_R$ is an additionally incorporated delay time constant of the control device that is equal to a sum of the delaying time constants >zero of the two filter apparatuses, namely $$T_R = T_{R1} + T_{R2} + \ldots + T_{RI}$$

and $T_t$ is a determined dead time ≥zero of the technical process to be controlled, and $T_{D\_overall}$ is a sum of all differentiating time constants $T_{D1}, T_{D2}, \ldots$ >zero of the second filter apparatus, namely $$T_{D\_overall} = T_{D1} + T_{D2} + \ldots.$$

* * * * *